(12) United States Patent
Shafir et al.

(10) Patent No.: US 12,742,724 B2
(45) Date of Patent: *Sep. 22, 2026

(54) METHOD AND SYSTEM FOR OPTICAL CHARACTERIZATION OF PATTERNED SAMPLES

(71) Applicant: NOVA LTD., Rehovot (IL)

(72) Inventors: Dror Shafir, Kiryat Ono (IL); Gilad Barak, Rehovot (IL); Shay Wolfling, Qiryat-Ono (IL); Michal Haim Yachini, Rehovot (IL); Matthew Sendelbach, Fishkill, NY (US); Cornel Bozdog, San Jose, CA (US)

(73) Assignee: NOVA LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,319

(22) Filed: Jan. 29, 2024

(65) Prior Publication Data

US 2024/0337590 A1 Oct. 10, 2024

Related U.S. Application Data

(63) Continuation of application No. 17/135,924, filed on Dec. 28, 2020, now Pat. No. 11,885,737, which is a (Continued)

(51) Int. Cl.
*G01N 21/21* (2006.01)
*G01N 21/47* (2006.01)

(52) U.S. Cl.
CPC .......... *G01N 21/21* (2013.01); *G01N 21/211* (2013.01); *G01N 2021/4792* (2013.01); *G01N 2201/061* (2013.01); *G01N 2201/0683* (2013.01)

(58) Field of Classification Search
CPC ................ G01N 21/21; G01N 21/211; G01N 2021/4792; G01N 2201/061; G01N 2201/0683
See application file for complete search history.

(56) References Cited

U.S. PATENT DOCUMENTS 5,046,847 A * 9/1991 Nakata .................. G01N 21/94
356/338
5,757,494 A 5/1998 Green et al.
(Continued)

FOREIGN PATENT DOCUMENTS

WO 14016839 1/2014

OTHER PUBLICATIONS

Bozdog C. et al., "Metrology Solution for Double Patterning Processing", AEC/APC Symposium XIX, Indian Wells, CA, pp. 1-31, ( Sep. 15-19, 2007).

(Continued)

*Primary Examiner* — Sang H Nguyen
(74) *Attorney, Agent, or Firm* — Reches Patents

(57) ABSTRACT

A method and system are presented for use in measuring on patterned samples, aimed at determining asymmetry in the pattern. A set of at least first and second measurements on a patterned region of a sample is performed, where each of the measurements comprises: directing illuminating light onto the patterned region along an illumination channel and collecting light reflected from the illuminated region propagating along a collection channel to be detected, such that detected light from the same patterned region has different polarization states which are different from polarization of the illuminating light, and generating a measured data piece indicative of the light detected in the measurement. Thus, at least first and second measured data pieces are generated for the at least first and second measurements on the same patterned region. The at least first and second measured data (Continued)

pieces are analyzed and output data is generated being indicative of a condition of asymmetry in the patterned region.

16 Claims, 7 Drawing Sheets

Related U.S. Application Data continuation of application No. 16/042,448, filed on Jul. 23, 2018, now Pat. No. 10,876,959, which is a continuation of application No. 14/265,771, filed on Apr. 30, 2014, now abandoned.

(56) References Cited

U.S. PATENT DOCUMENTS

| | | | | |
|---|---|---|---|---|
| 5,956,145 | A | 9/1999 | Green et al. | |
| 6,020,966 | A * | 2/2000 | Ausschnitt | G01B 11/028 356/369 |
| 6,734,968 | B1 | 5/2004 | Wang et al. | |
| 6,804,003 | B1 | 10/2004 | Wang et al. | |
| 6,965,874 | B2 | 11/2005 | Joseph | |
| 6,974,962 | B2 | 12/2005 | Brill et al. | |
| 7,075,650 | B1 | 7/2006 | Johs et al. | |
| 7,122,817 | B2 | 10/2006 | Brill et al. | |
| 7,211,112 | B2 | 5/2007 | Baynham et al. | |
| 7,301,163 | B2 | 11/2007 | Brill et al. | |
| 7,379,183 | B2 | 5/2008 | Mieher et al. | |
| 7,460,981 | B2 | 12/2008 | Bultman et al. | |
| 7,492,455 | B1 | 2/2009 | Johs et al. | |
| 7,990,546 | B2 * | 8/2011 | Yeo | G03F 7/70616 356/601 |
| 8,525,993 | B2 | 9/2013 | Rabello et al. | |
| 8,705,034 | B2 * | 4/2014 | Fukazawa | G01N 21/21 356/369 |
| 10,288,408 | B2 * | 5/2019 | Smith | G01N 21/956 |
| 10,876,959 | B2 | 12/2020 | Shafir et al. | |
| 11,885,737 | B2 * | 1/2024 | Shafir | G01N 21/21 |
| 2004/0233442 | A1 | 11/2004 | Mieher et al. | |
| 2006/0102830 | A1 | 5/2006 | Brill et al. | |
| 2006/0274310 | A1 | 12/2006 | Kandel et al. | |
| 2007/0034816 | A1 | 2/2007 | Brill et al. | |
| 2007/0109551 | A1 * | 5/2007 | Aiyer | G01B 9/02057 356/485 |
| 2008/0165643 | A1 * | 7/2008 | Takeda | G11B 7/005 369/53.2 |
| 2009/0103093 | A1 | 4/2009 | Liphardt et al. | |
| 2009/0147247 | A1 | 6/2009 | Endo et al. | |
| 2010/0004773 | A1 | 1/2010 | Kochergin | |
| 2010/0245819 | A1 | 9/2010 | Li | |
| 2010/0272132 | A1 * | 10/2010 | Yamazoe | H01S 3/1103 372/18 |
| 2011/0080585 | A1 | 4/2011 | Rabello et al. | |
| 2011/0109906 | A1 | 5/2011 | Liphardt et al. | |
| 2012/0120396 | A1 * | 5/2012 | Kandel | G01B 11/14 356/399 |
| 2013/0070234 | A1 | 3/2013 | Li et al. | |
| 2013/0265577 | A1 | 10/2013 | Peng et al. | |
| 2014/0055661 | A1 | 2/2014 | Imamura et al. | |
| 2015/0316468 | A1 | 11/2015 | Shafir et al. | |
| 2018/0328837 | A1 | 11/2018 | Shafir et al. | |

OTHER PUBLICATIONS

Christian Brosseauy, "Time reversal symmetry-induced restrictions in polarization optics", Pure Appl. Opt., pp. 755-I759, vol. 5, (1996).

Dror Shafir et al, "Mueller matrix characterization using spectral reflectometry", Proc. of SPIE, pp. 1-9, vol. 8789,878903, (May 13, 2013).

Horibajobinyvon, "What is the Mueller Matrix and Why is it Useful?" France Apr. 2005.

Li al, "Mueller matrix measurement of asymmetric gratings", J_ Micro/Nanolith. MEMS MOEMS, pp. 041305-1to 041305-8, vol. 9, No. 4, (Oct.-Dec. 2010).

Li, L., "Symmetries of cross-polarization diffraction coefficients of gratings", Opt. Soc. Am. A. Opt. Image_ Sci. Vis., pp. 881-887, vol. 17, No. 5, (May 2000).

Sadjadi, R, et al, "Plasma-Assisted CD Shrink and Overlay Metrology Techniques for Double Patterning", ISSM 2007, Santa Clara, CA ( Oct. 15-17, 2007)—Abstract only.

* cited by examiner

METHOD AND SYSTEM FOR OPTICAL CHARACTERIZATION OF PATTERNED SAMPLES

TECHNOLOGICAL FIELD

The present invention is in the field of optical metrology/characterization and design of samples, and is generally directed at metrology measurements in patterned samples, such as semiconductor wafers.

BACKGROUND ART

References considered to be relevant to the background to the presently disclosed subject matter are listed below:

[1] Li, J., Hwu, J. J., Liu, Y., Rabello, S., Liu, Z., Liu, J. and Hu, J., "*Mueller matrix measurement of asymmetric gratings,*" J. Micro/Nanolith. MEMS MOEMS 9 (4), 041305 (2010).

[2] Li, L., "*Symmetries of cross-polarization diffraction coefficients of gratings*," Opt. Soc. Am. A. Opt. Image. Sci. Vis., 17 (5), 881 (2000).

[3] Sadjadi, R, Zhu, H., Cirigliano P., Pavel, E., Athayde, A., Bozdog, C., Sendler, M., Mor, D., "*Plasma-Assisted CD Shrink and Overlay Metrology Techniques for Double Patterning,*" ISSM 2007, Santa Clara, CA (2007).

[4] Bozdog C., Sendler M., Mor D., Zhu H., Sadjadi R., Cirigliano P, and Pavel E., "*Metrology Solution for Double Patterning Processing,*" AEC/APC Symposium XIX, Indian Wells, CA (2007).

[5] Christian Brosseauy, "*Time reversal symmetry-induced restrictions in polarization optics*", Pure Appl. Opt. 5 (1996) 755-759.

Acknowledgement of the above references herein is not to be inferred as meaning that these are in any way relevant to the patentability of the presently disclosed subject matter.

BACKGROUND

Microelectronic devices are widely used and are becoming smaller in dimension as well as more complex. Manufacturing of such microelectronic devices requires accurate inspection and metrology to identify appropriate patterns on wafer substrates as well as identify defects in such patterns. Various techniques are known, utilizing optical reflectometry based techniques, for analyzing surface patterns by analyzing properties of light reflected from the sample under inspection. Generally, the structure of a sample can be characterized (obtaining information on the geometry and material properties of the structure) by analyzing the sample's reflectance at different wavelengths, different polarization states and different directions.

Accurate characterization of the geometrical and material properties of microelectronic devices becomes increasingly challenging, as the critical dimensions become ever smaller and the devices become ever more complex. Optical reflectometry is an extremely effective method for obtaining information on the geometry and material properties of such structures. In this method, broadband light is shone on a sample and collected after being reflected from it. By analyzing the reflectance of different wavelengths and in addition polarization components of the incident light, and/or different angles of incidence and/or azimuths, it is possible to obtain information on the structure of the sample. Commonly, optical reflectometry is applied to test structures including a repeating array of identical elements. Conventional metrology methods are used for defining certain parameters of the pattern samples, including geometric parameters and materials characteristics of the pattern.

GENERAL DESCRIPTION

There is a need in the art for a novel measurement technique for measurements on patterned samples/structures, suitable for detecting certain asymmetry variations in the pattern(s).

The present invention provides a measurement technique capable of identifying asymmetry in the sample, e.g. identifying tilting in periodic gratings (patterns), overlay inaccuracies, etc. It should be noted that the terms "asymmetry" and "symmetry" used herein refer to patterns in a sample. This may be a surface pattern in an uppermost layer of a sample, or a pattern formed by a stack of two or more layers, as for example in overlay measurements. Development of asymmetry in a pattern could be an important attribute of the sample manufacturing process which should be properly identified. For example, gratings are typically designed to be mirror-symmetric, while imperfections in the fabrication process may cause them to tilt in one direction and/or cause deviation between the alignment of the two gratings, breaking such symmetry. In some cases, development of asymmetry in a specifically designed test structure could be used for identifying misalignment of patterned layers in a corresponding production structure, like in case of overlay, double- or multi-patterning, SADP, SATP etc.

The technique of the present invention provides for identification quantification of asymmetry in the pattern features by detecting variations of an optical response of the pattern from that of the symmetry-related response. The technique of the invention may be used to identify a level of asymmetry in a sample to better characterize the sample's structure. For example, the technique of the invention provides detection of symmetry defects including tilted walls of a surface relief, overlay or misalignment of layers, etc., e.g. for the purposes of controlling the manufacturing process.

It should be noted that, for simplicity, the technique of the invention is described herein below with reference to mirror (reflective) symmetry along one or two axes. However, it should be understood that the principles of the invention may be utilized for detecting deviations from various other symmetry conditions of the optical response of a patterned sample, as well as a combination of various symmetry conditions, e.g. including mirror (reflective) symmetry.

In some embodiments, the invention utilizes performing differential measurements on a sample and obtaining for example, symmetry-related information based on a difference in optical response of the sample for different polarization states. This is based on the inventors' understanding that asymmetric patterns, contrary to symmetric ones, affect (rotate) the polarization of light incident thereon thus differently affecting light components of different polarization states.

In this connection, it should be noted that the term "polarization state" as used herein refers to unpolarized light, and light of a specific orientation of its preferred plane of polarization. For example, incident light may be unpolarized or may have a specific orientation of the preferred plane of polarization. As for the detected light, in some embodiments, two different polarization components are (sequentially or generally, separately) detected for the same polarization state of the incident light.

Thus, a sample under measurements is illuminated by light having predetermined properties (wavelength, polarization state, angle of incidence), propagating towards the sample along an illumination channel. Light returned (reflected) from an illuminated region on the sample is collected through an appropriate collection channel, and different polarization components of the reflected light are detected to provide measured data indicative thereof.

For simplicity, polarization states of light as described herein below are defined as being spanned by p and s linear polarization states. As known in the art, the p polarization state is defined such that the electric field vector is parallel to the surface of the sample, while the s polarization state has a component of the electric field vector perpendicular to the surface.

Thus, according to one broad aspect of the invention, there is provided a method for use in measuring on patterned samples, the method comprising:

performing a set of at least first and second measurements on a patterned region of a sample, each of the measurements comprising: directing illuminating light onto said patterned region along an illumination channel and collecting light reflected from said region propagating along a collection channel to be detected, such that detected light has a polarization state different from polarization of the illuminating light, and generating a measured data piece indicative of the light detected in the measurement, thereby generating at least first and second data pieces for said at least first and second measurements on the same patterned region, where the at least first and second measured data pieces correspond to the detected light having different polarization states; and analyzing a set of said at least first and second measured data pieces and generating output data indicative of a condition of asymmetry in said patterned region.

The illumination and collection channels define an illumination-collection plane which may be aligned substantially parallel or substantially perpendicular to the measured pattern, i.e. to the major axis defined by the arrangement of the features of the pattern. The illuminating light may be of the polarization state corresponding to a preferred plane of polarization oriented substantially parallel or substantially perpendicular to a pattern direction (major axis), and the collection channel be configured for collecting light having the orthogonal polarization state with respect to the polarization state of the illuminating light.

The analyzing of the set of the measured data pieces may comprise determination of a relation between them, which is indicative of a level of asymmetry and a direction of asymmetry of the pattern in the patterned region. To this end, the relation between the measured data pieces may be analyzed with respect to a predetermined threshold.

The illuminating light may be incident onto the measured region with oblique illumination. The collected light preferably includes specularly reflected light from the illuminated region.

The different polarization states of detected light in the measurement may correspond to orthogonal polarizations of light; linear polarizations at ±45°; clockwise and counterclockwise circular polarizations of light. These different polarization states of the detected light may be used with either different polarization states of illumination or with unpolarized illumination. More specifically, in some embodiments, substantially unpolarized illumination is used in both measurements and first and second different polarization states of light in the first and second measurements, respectively, e.g. linear polarizations at ±45°; in some other embodiments the illumination includes light of first and second different polarization states and light of the second and first polarization states respectively is detected, e.g. illumination with linear polarizations at ±45° and detection of cross linear polarizations, or illumination with clockwise and counterclockwise circular polarizations and detection of opposite circular polarization.

According to another broad aspect of the invention, there is provided a system for use in measurements in patterned samples, the system comprising:

(a) an illumination unit and a light detection unit which are configured to define an illumination channel for illuminating a region of a sample with an illuminating beam and a collection channel for detecting collected light by a detector, which generates data indicative of detected light;

(b) a polarization unit comprising at least one polarization filter located in the collection channel and configured and operable to allow passage of light of a polarization state different from polarization of the illuminating light beam to the detector for generating a measured data piece corresponding to the light detected in a measurement, and (c) a control unit configured and operable to receive the data indicative of the detected light from same patterned region of a sample and generating and analyzing at least first and second corresponding measured data pieces, where the first and second measured data pieces correspond to detected light of different polarization states which are different from the polarization of the illuminating light beam, and generating output indicative of a condition of symmetry of the pattern in said region of the sample.

The control unit may be configured for analyzing the at least first and second measured data pieces to determine a relation between them and generate the output data including information about a level of asymmetry and a direction of the asymmetry in the pattern.

The polarization unit may comprise the polarization filter shiftable between its different operational states corresponding to different polarization states of the collected light. The polarization filter may be a linear polarization filter, and the control unit may be configured to controllably rotate the polarization filter to ±45° with respect to p linear polarization state. The polarization filter may be a circular polarization filter configured to selectively allow passage of light of clockwise or counterclockwise polarization states; and the control unit may be configured to selectively switch between the clockwise and counterclockwise states.

The illumination unit may be configured to provide illumination with unpolarized light in all of the at least first and second measurements. In that case detection of light having different polarization states could be performed in parallel, using static polarizers and collecting ordinary and non-ordinary beams, or sequentially, using rotatable/movable polarization unit.

In yet further example, the polarization unit may comprise at least one polarization filter in the illumination channel operable to sequentially provide at least first and second illuminating light beams having at least first and second different polarization states respectively. The control unit may be configured to controllably operate the polarization unit to illuminate the same region on the sample with the first and second illuminating beams of the first and second polarization states for the detection of light.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 4C exemplifies illumination and collection with circular polarized light; and FIG. 4D exemplifies the use of s and p polarized light;

DETAILED DESCRIPTION

As indicated above, the technique of the present invention allows for simple and robust characterization of patterned sample to identify asymmetry of a pattern, as well as determine a level of asymmetry.

Figure 1A:
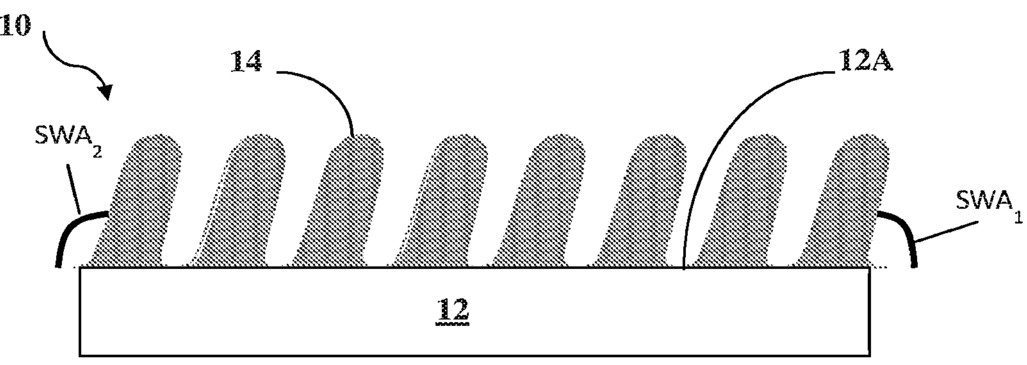
FIG. 1A exemplifies a patterned structure wherein a pattern is asymmetric in that the features of the pattern are tilted.
Figure 1B:
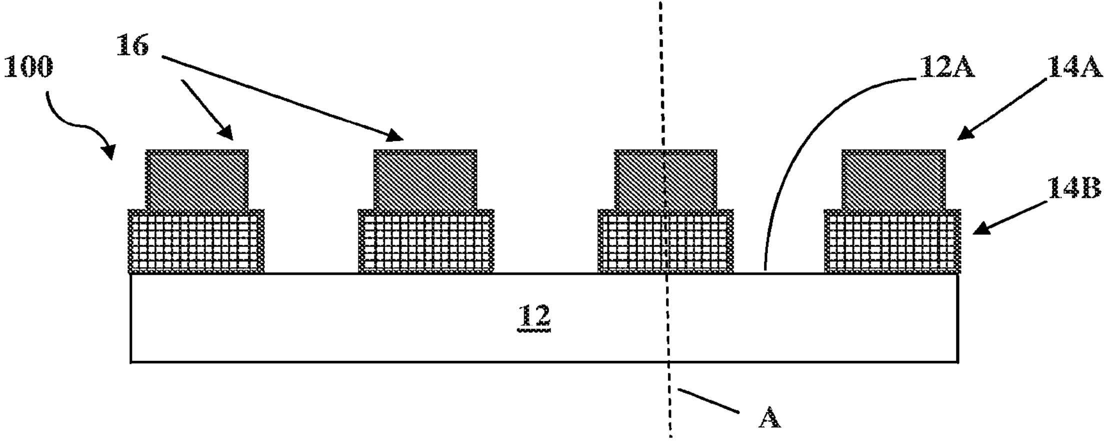
FIG. 1B and FIG. 1C exemplify test structures with, respectively, matched patterns in two adjacent patterned layers (symmetric configuration) and a mismatched overlay pattern (asymmetric due to a shift between the patterns)
Figure 1C:
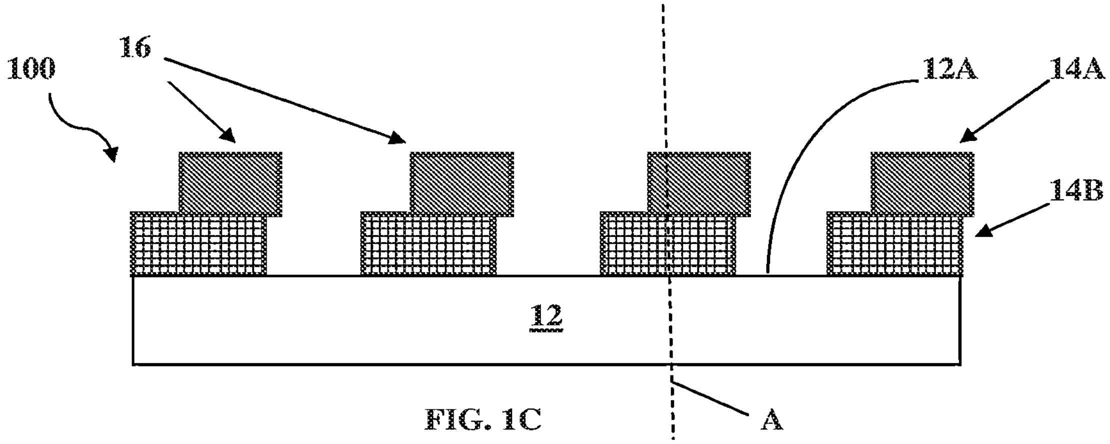

Reference is made to FIGS. 1A to 1C schematically exemplifying asymmetry of patterns in patterned samples, which might occur during the manufacturing process.

FIG. 1A illustrates a sample 10 including a substrate structure 12 (single or multi-layer structure) with a patterned layer 14 on surface 12A of the substrate, where a pattern is in the form of a tilted grating 14 (constituting an asymmetric pattern, which in this particular example is breaking the mirror symmetry). Such a tilted grating might result from imperfections in the fabrication (patterning) process. As shown, side wall angles $SWA_1$ and $SWA_2$ of the grating 14 are unequal.

The example of FIGS. 1B and 1C illustrate a sample 100 including a substrate structure 12 (single or multi-layer structure) having a surface 12A on which two patterned layers with patterns 14A and 14B respectively are formed, one above the other (with or without intermediate layer(s) between them). As shown in FIG. 1B, the pattern features 16 are properly aligned corresponding to matched overlay between the patterns 14A and 14B resulting in mirror symmetry along an axis A, while FIG. 1C illustrates a similar sample having a mismatch overlay between patterns 14A and 14B due to asymmetry in the pattern features 16.

Common metrology techniques are generally used to identify specific attributes of patterned samples. Such attributes include various geometric parameters as well as material characteristics. This is while the symmetry, or asymmetry, of patterns on the sample may be an important parameter, either in cases where asymmetry is considered as defect or when a certain level of asymmetry is desired.

As indicated above, the technique of the present invention provides for detection of asymmetry and preferably also measuring a level of asymmetry, and is exemplified herein with reference to reflection symmetry (also termed mirror-symmetry), i.e. symmetry of a pattern with respect to certain plane. More specifically, the technique of the invention allows for measuring the asymmetry level (shift value and direction of shift, e.g. for overlay measurements) e.g. with respect to a plane determined by a major axis of the arrangement of the pattern features. For example, in order to identify misalignment along one axis, a pattern or grating on the sample along said axis is measured. Determining misalignment along both the x and y axes requires measurements on gratings, or grating-like structures along both axes. As indicated above, one or more intermediate layers may exist between the two patterned layers, while the intermediate layer(s) is/are of less interest.

Thus, the technique of the present invention is based on measurements of optical response (reflection and/or diffraction) of a patterned sample to incident light, being monochromatic or polychromatic light. In some embodiments, the technique utilizes a set of two or more measurements on the same region of a sample, for example where light of different polarization states, with respect to that of the incident light, is detected. In some embodiments, the measurements are applied to several (generally, at least two) predetermined locations on the sample, for example within test sites.

Figure 2A:
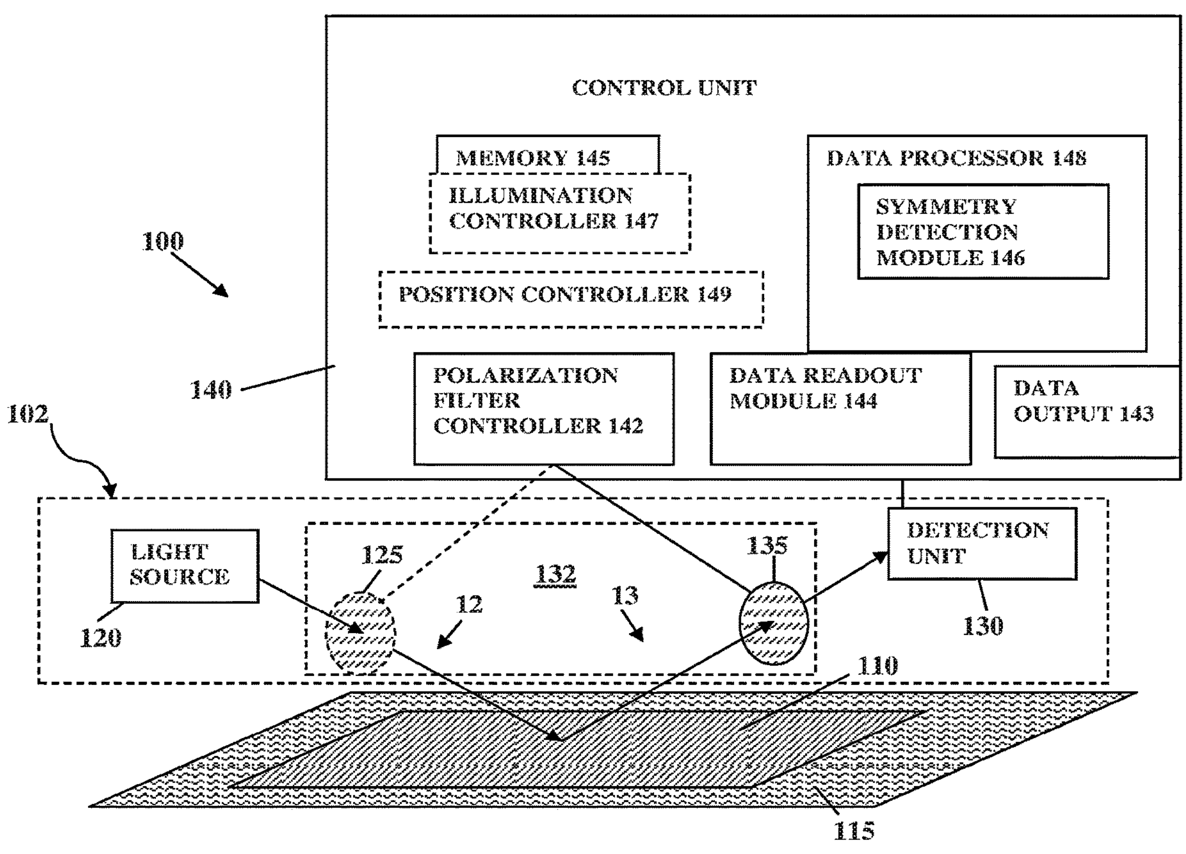
FIG. 2A illustrates schematically a measurement system suitable for implementing the technique of the invention.

Reference is made to FIG. 2A schematically illustrating, by way of a block diagram, a measurement system 100 of the invention configured and operable for identifying asymmetry of a patterned sample and preferably determining a level of asymmetry. The measurement system 100 includes an optical unit 102 accommodated with respect to a sample holder 115, and connectable, via wires or wireless signal transmission, with a control unit 140. The optical unit 102 defines an illumination channel 12 and a collection channel 13, and includes a light source unit 120 configured to illuminate at least a region on the surface of a sample through the illumination channel 12, a detection unit 130 configured to receive light returned (reflected) from the sample and propagating along the collection channel 13. Further provided in the optical unit 102 is a polarization unit 132 associated with at least the collection channel 13, i.e. includes one or more polarizer filters located at least in the collection channel 13.

The control unit 140 is typically an electronic device including inter alia such software/hardware utilities/modules as data input (or data readout) and output 144 and 143, memory 145, and data processor 148, and also includes a polarization filter controller 142. The control unit 140 may also include an illumination controller 147, as well as a position controller 149. The control unit 140 is thus configured to operate the optical unit (i.e. its polarization unit 132 and possibly also the light source unit 120), and receive and process measured data provided by the detection unit 130 as will be described further below.

The optical unit 102 is preferably configured (i.e. its elements are accommodated with respect to the sample holder and with respect to one another) to orient the illumination and collection channels 12 and 13 such that the collection channel collects light including specular reflection from the sample. Additionally, the optical unit 102 may be configured to orient the illumination and collection channels with an oblique light propagation arrangement with respect to the sample plane such that s and p polarization states can be well defined.

The polarization unit 132 includes at least one polarization filter 135, located in the collection channel 13 which may provide a linear or circular polarization. In this connection, a circular polarization filter is an optical assembly configured to allow transmission of either clockwise or counterclockwise polarization component of light. Such circular polarization filter may include a linear polarizer located in between two quarter-wave plates, and may be oriented such that only clockwise (or counterclockwise) polarization component pass through the polarizer assembly. The control unit 140 includes the polarization controller 149 connectable to the polarization filter 135 (generally, to the polarization unit 132) and configured to controllably vary the orientation of its preferred plane of polarization between different polarization states (at least a first polarization state and a second polarization state).

Additionally, in some embodiments, the polarization unit 132 also includes one or more polarization filters 125 located in the illumination channel 12. The illumination-channel polarization filter 125 may be generally similar to the collection-channel polarization filter 135 but differing in the orientation of its preferred plane of polarization and thus differing in the polarization component it transmits. The control unit 140 (its polarization controller 149) may also be connectable to the polarization filter 125 and configured to cause the polarization filter 125 to rotate or shift between at least first and second orientations, thereby transmitting light of a first or second polarization state.

The control unit may include the illumination controller 147 to operate the light source unit 120 to provide illumination of a selected type (wavelengths, illumination pattern, and/or operation mode, i.e. CW or pulse mode), and may include the position controller 149 for operating a relative accommodation between the sample holder 115 and at least some elements of the optical unit 102, e.g. for providing measurements on preset or desired locations on the sample.

For example, the control unit 140 may operate the light source unit 120 to sequentially illuminate the sample 110 with predetermined first and second different polarization states of light, or unpolarized and polarized light. The polarization filter controller 142 may accordingly operate the collection-channel polarizer 135 and possibly also the illumination-channel polarizer 125 to allow sequential detection of predetermined polarization components of reflected light, and generate first and second measured data indicative thereof (i.e. indicative of intensity of the corresponding polarization component in the detected light).

The data processor utility 148 of the control unit includes a symmetry detection module 146 (software utility) which is adapted (preprogrammed) to analyze the first and second measured data pieces, and generate data indicative of existence of asymmetry in the pattern being measured. In some embodiments, the symmetry detection module also operates to determine a relation between the first and second measured data pieces (e.g. difference), and estimate a level of asymmetry of the pattern on the sample being measured.

The invention provides a measurement scheme which is preferably based on spectral reflectometry, where the light response of the sample over a broad spectral range is measured. Preferably, illumination is at oblique angle to the sample, and collection is correspondingly aligned to collect specularly reflected light (i.e. at the same angle as illuminating channel angle). Two (or more) measurements are applied, in one or more orientations of the analyzer (polarizer filter 135 in the collection channel) and possibly also the polarizer 125 in the illumination channel. The data processing scheme is aimed at highlighting the information on the sample's asymmetry. For example, the illumination channel may be operated to sequentially provide illumination of the same region with two or more different polarization states of incident light, while the collection channel is operated to sequentially collect one or more different polarization components of the reflected light, selected in accordance with the polarization state of the incident light.

Let us consider a patterned sample including at least one grating structure (pattern) along an axis being a longitudinal grating axis. This is illustrated schematically in FIG. 2B. In this specific but not limiting example, the unpolarized light source 120 is used, and the polarizing unit 132 includes the illumination-channel polarizer 125 and the collection-channel analyzer 135. The use of the technique of the invention with this measurement scheme, utilizing various (at least first and second) orientations of the preferred plane of polarization of the illuminated and detected light components, provides for determining data indicative of a level of asymmetry of the pattern with respect to reflection about a plane perpendicular to the longitudinal grating axis.

The first and second polarization states of the illumination may be controlled by orientation of the polarization filter 125 located in the illumination channel 12. As will be described further below, according to some embodiments, the first and second different polarization states of illumination may be obtained by circular or elliptical polarization of light. The illumination channel polarization filter 125 may be generally similar to the collection-channel polarization filter 135 and may be controlled by the polarization filter controller 142 to sequentially allow collection of light components of first or second selected polarization states.

Figure 3:
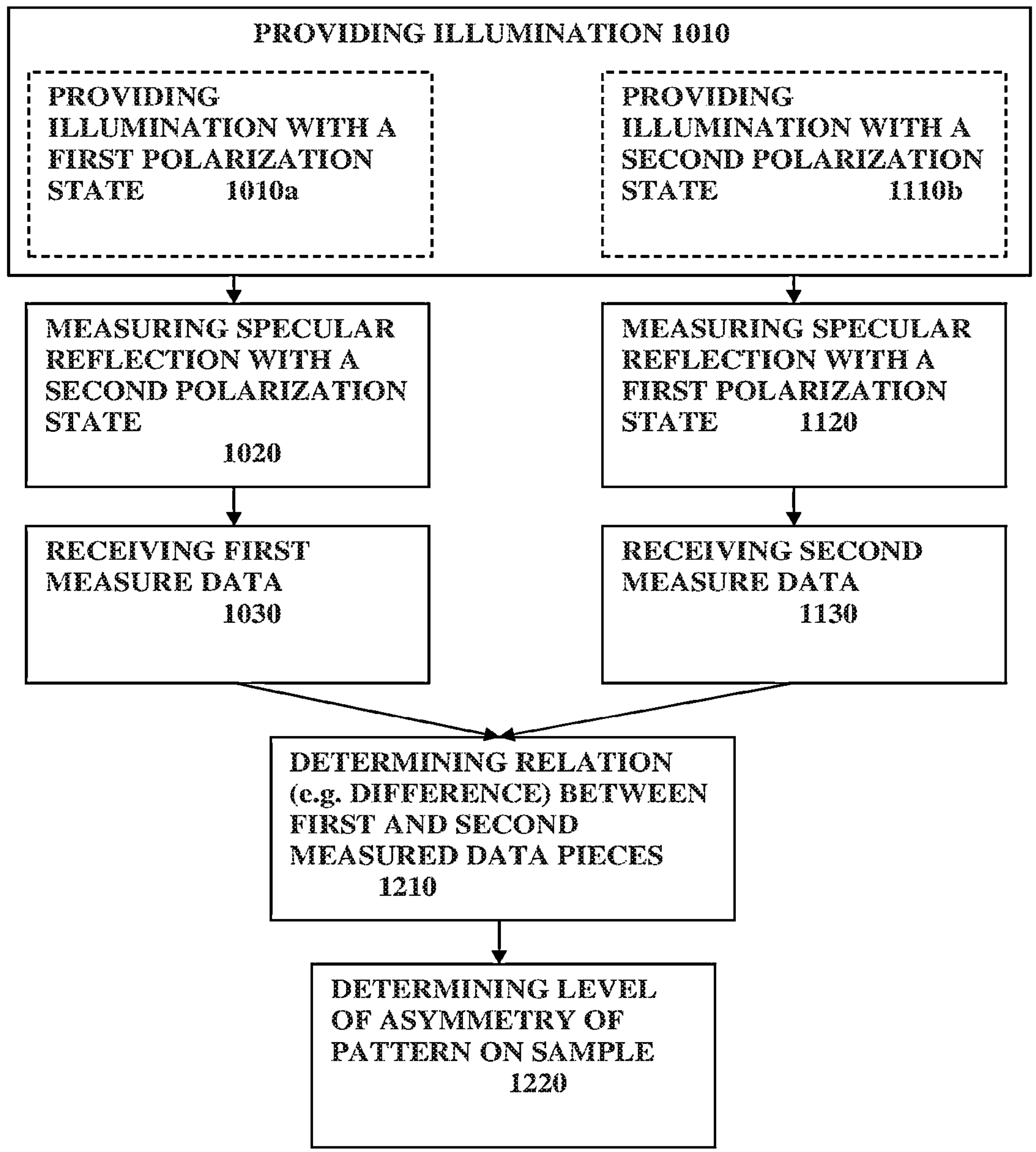
FIG. 3 shows a flow diagram exemplifying a method according to the present invention.

Reference is made to FIG. 3 exemplifying a method of the invention for detection of the condition of asymmetry and possibly also determining a degree of symmetry/asymmetry of the surface pattern/grating on the sample. As described above, in some embodiments, the invention utilizes a plurality, generally at least two, reflectivity measurements on the same region of a sample. The two measurements utilizes (at least) detection of light of two different polarization states, respectively, which are reflected from the sample in response to illumination that could be unpolarized or having different polarization states for two measurements.

As shown in the figure in a self-explanatory manner, first and second measurement sessions 1010 and 1110 are applied to the same region on the sample. It should be understood that the measurement sessions are different from one another in the detection of light of different polarizations states, both different from that of the illumination, while the two measurement session may be performed concurrently in case the illumination is unpolarized in both measurements, or sequentially, in case the illumination is performed sequentially 1010*a* and 1110*b* with first and second different polarization states respectively. Thus, during the measurement sessions 1010 and 1110 light with different polarization states is detected being modified by a sample under measurements in response to unpolarized or polarized illumination; and first and second measured data pieces 1020 and 1120 indicative of the intensity for the first and second detected specular reflection light components of different polarization states are obtained, for the two measurement sessions respectively. In case of unpolarized illumination, detection of light having different polarization states could be performed in parallel, using static polarizers and concurrently collecting ordinary and non-ordinary beams, or sequentially, using rotatable/movable polarization unit. The first and second measured data pieces are received, 1030 and 1130 (in parallel or sequentially), at the control unit and analyzed to identify the asymmetry condition: a change in the polarization state of the detected light with respect to that of the incident light; and preferably, a difference (generally, a relation, being in the form of a predetermined function of the measured data pieces) between the two measured data pieces measurements is determined (step 1210), and information indicative of a level of asymmetry of the pattern in the inspected region is provided (step 1220). It should be noted that an asymmetry of the pattern on a sample can be identified if the difference between the first and second measured data pieces is above a predetermined threshold.

As indicated above, the principles of the invention are based on the inventors' understanding of the reflective properties of patterned surfaces. Generally, reflection of polarized light can be described by the Jones formalism: when polarized light (fully polarized light), represented by Jones vector, crosses a linear optical element represented by Jones matrix the resulting polarization of the emerging light is found by taking the product of the Jones matrix of the optical element and the Jones vector of the incident light. The transverse electromagnetic (EM) field can be specified by the Jones vector $$\vec{P} = \begin{pmatrix} E_S e^{i(\omega t+\phi_s)} \\ E_p e^{i(\omega t+\phi_p)} \end{pmatrix} \quad \text{(equation 1)}$$

where $E_s$, $E_p$ are the field amplitudes in the s (perpendicular to the incidence plane) and p (parallel to the incidence plane) directions and $\omega$, $\phi_s$, $\phi_p$ are the angular frequency and phases of the EM wave. Additionally, scattering properties of a patterned surface (e.g. in the inspected region of the sample) can be described by the Jones matrix $$\hat{J} = \begin{pmatrix} r_{ss} & r_{sp} \\ r_{ps} & r_{pp} \end{pmatrix} \quad \text{(equation 2)}$$

The Jones matrix is a 2×2 complex matrix, holding reflection amplitude and phase for each element. Here, $r_{ij}$ is the complex reflectance component for incident polarization j and outgoing polarization i. For example, $r_{ss}$ is the complex reflected field in the s direction (perpendicular to the plane of incidence) when the incident field of linear polarization s. Similarly, $r_{sp}$ represents the reflected s polarized field for incident field linearly polarized in the p direction (parallel to the plane of incidence). The Jones matrix is thus related to the degree of polarization conversion created by the sample.

Figure 2B:
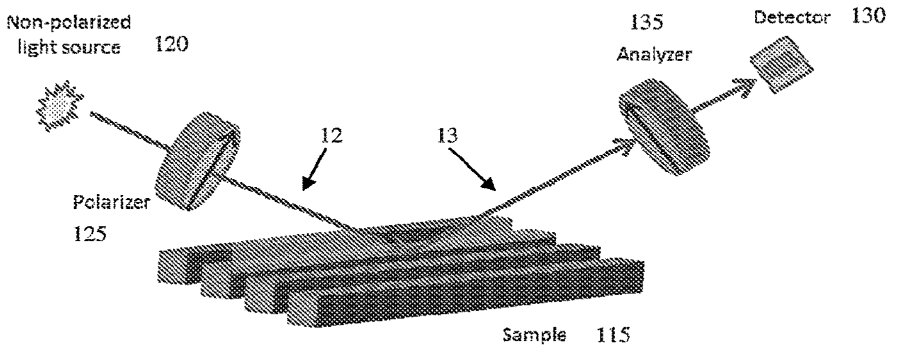
FIG. 2B exemplifies a measurement scheme used in the system of the invention.

As described above, the measurement system 100 according to some embodiments of the present invention exemplified in FIGS. 2A and 2B, includes a light source 120 followed by a polarization filter 125, for illuminating a sample with a specifically polarized light. Light specularly reflected from the sample is collected through an analyzer (linear polarization filter 135) onto a detector 130. This setup including Polarizer→Sample→Analyzer can be mathematically formulated by the expression:

$$E_{out} = (\cos\beta \quad -\sin\beta)\begin{pmatrix} |r_{ss}| & |r_{sp}|e^{i\varphi_1} \\ |r_{ps}|e^{i\varphi_2} & |r_{pp}|e^{i\varphi_3} \end{pmatrix}\begin{pmatrix} \cos\alpha \\ \sin\alpha \end{pmatrix} \quad \text{(equation 3)}$$

where the measured intensity is $|E_{out}|^2$, $\alpha$ and $\beta$ are the polarizer and analyzer angles with respect to the incidence plane, respectively, and $$\hat{J} = \begin{pmatrix} |r_{ss}| & |r_{sp}|e^{i\varphi_1} \\ |r_{ps}|e^{i\varphi_3} & |r_{pp}|e^{i\varphi_2} \end{pmatrix}$$

is the Jones matrix of the inspected region of the sample.

It should be noted that the phase components of the complex coefficients of the Jones matrix are explicitly shown here for simplicity. It should be noted that the phase may be arbitrarily selected to be zero for the $r_{ss}$ coefficient while the relative phase between different components of the EM radiation has a specific measurable meaning.

A sample having a symmetric pattern/structure has reflection symmetry with respect to at least one plane. For example, grating lines are symmetric to reflection, but tilted grating lines, i.e. having different left and right SWA as exemplified in FIG. 1A, are not symmetric to reflection. A patterned surface that is symmetric to reflection can be described by polarization rotation coefficients of the Jones matrix satisfying the condition $r_{ps}+r_{sp}=0$. Accordingly, determination of the quantity $\delta \equiv r_{sp}+r_{ps}$, generally known as the asymmetry coefficient, provides a sensitive indication on asymmetry level of the inspection region/sample [5].

Reference is now made to FIGS. 4A to 4D illustrating four examples of the measurement technique of the present invention. These embodiments utilize different orientations of the polarization states of incident and detected light components to determine the level of asymmetry of a pattern in a region of the sample being measured.

Figure 4A:
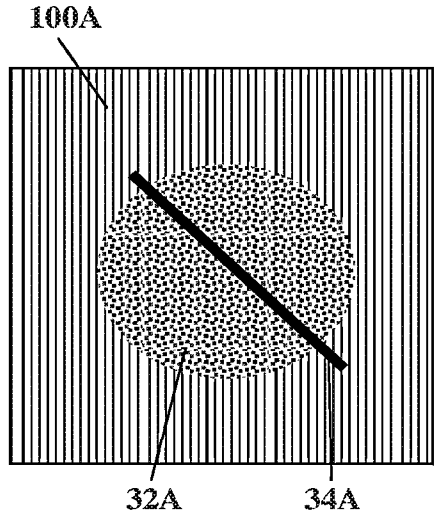
FIGS. 4A to 4D illustrate four examples of the technique of the invention, wherein FIG. 4A exemplifies light collection with linear polarization, FIG. 4B exemplifies illumination and collection with linear polarized light.
Figure 4A:
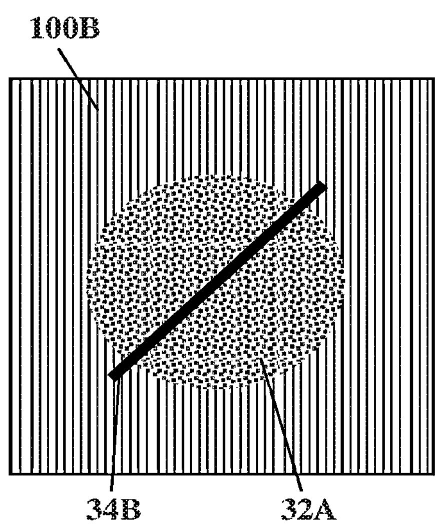

FIG. 4A illustrates an example of first and second measurement sessions on a patterned region of a sample. As shown in the figure, in a first measurement session, denoted 100A, a spot 32A on the sample's surface is illuminated. Light reflected from this region 32A is collected through the polarization filter (analyzer 135 shown in FIGS. 2A and 2B) having certain first orientation of its preferred plane of polarization (first polarization state) 34A. In a second measurement session, denoted 100B, the same region 32A of the sample is illuminated and the reflected light is collected through the analyzer at a different second orientation of its preferred plane of polarization (second polarization state) 34B.

In some embodiments of the present invention, the illumination is unpolarized in both the first and second measurement sessions. Thus, the illumination region 32A is substantially the same in the first and second measurement sessions. In this configuration, the collection channel utilizes a linear polarization filter (analyzer) configured and operable to selectively pass light of the first and second polarization states. In the first measurement, the analyzer is oriented to allow passage of light at 45 degrees to the p polarization (generally at $1/\sqrt{2}$[p+s]), while in the second measurement, the analyzer is oriented to allow passage of light at −45 degree (generally at $1/\sqrt{2}$[p−s]). Utilizing the above described equation 3 and the Jones matrix, the detected intensity is provided by:

$$E_{out} = (\cos\beta \quad -\sin\beta)\begin{pmatrix} |r_{ss}| & |r_{sp}|e^{i\varphi_1} \\ |r_{ps}|e^{i\varphi_3} & |r_{pp}|e^{i\varphi_2} \end{pmatrix}\begin{pmatrix} 1/2 \\ 1/2 \end{pmatrix} \quad \text{(equation 4)}$$

The measured intensity in the first and second measurements is shown in Table 1 below. As can be seen, the measured intensities provide indication on the level of asymmetry of the inspected region as these intensities relate to the above described quantity δ.

TABLE 1

| Measurement # | β | $\lvert E_{out}\rvert^2$ |
|---|---|---|
| 1 | π/4 | $\lvert r_{ss}+r_{pp}+r_{sp}+r_{ps}\rvert^2=\lvert R+\delta\rvert^2$ |
| 2 | −π/4 | $\lvert r_{ss}+r_{pp}-r_{sp}-r_{ps}\rvert^2=\lvert R-\delta\rvert^2$ |

As described above, $\delta\equiv r_{sp}+r_{ps}$ and $R\equiv r_{ss}+r_{pp}$. Determining the difference between the first and second measured intensities provides:

$$|R+\delta|^2-|R-\delta|^2=4\Re\{\delta R^*\}=2(r_{sp}+r_{ps})(r_{ss}+r_{pp})^*+c.c. \quad \text{(equation 5)}$$

Here, and along the description, the term c.c. describes the use of complex conjugate of the previous term.

Generally, this embodiment may utilize simpler optical setup (including less optical elements, as no polarizer is used in the illumination channel), and may be beneficial in terms of light budget (lack of polarizer in the illumination channel increases the amount of light incident onto the sample). It should, however, be noted that the illumination light is preferably unpolarized, and the use of elliptical polarized light may cause variations in the measured data.

Figure 4B:
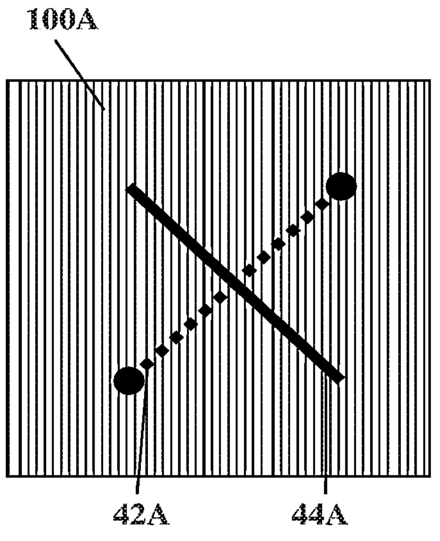
Figure 4B:
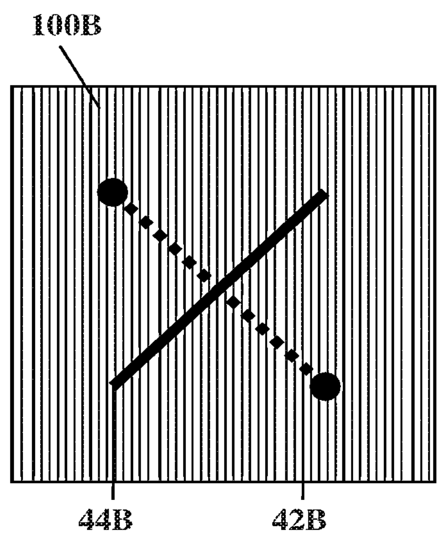

FIG. 4B illustrates another embodiment of the technique of the invention. In this example, assessment of asymmetry is accomplished as follows: The sample's reflectivity is first measured with a polarizer in the illumination path and an analyzer in the collection path aligned at 45 and −45 degrees, respectively, to the p polarization (parallel to the plane of incidence). The second measurement is then performed with the polarizer and analyzer aligned at −45 and 45 degrees respectively to the p polarization. More specifically, in this example, the illumination spots 42A and 42B in the first and second measurements are formed on the same region of the sample by light of linear polarizations, oriented at ±45 degree respectively with respect to the p polarization. The collection channel utilizes the analyzer at the orthogonal polarization orientations 44A and 44B, i.e. if the sample is illuminated at it $1/\sqrt{2}$[p+s] the analyzer is configured to pass light at $1/\sqrt{2}$[p−s] and vice versa. Utilizing the above equation 3, the level of asymmetry of the inspected region can be determined in accordance with the following Table 2, which projects the measurement configuration on Jones matrix as described above.

TABLE 2

| Measurement # | α | β | $\lvert E_{out}\rvert^2$ |
|---|---|---|---|
| 1 | π/4 | −π/4 | $\lvert r_{ss}+r_{pp}+r_{sp}+r_{ps}\rvert^2=\lvert R+\delta\rvert^2$ |
| 2 | −π/4 | π/4 | $\lvert r_{ss}+r_{pp}-r_{sp}-r_{ps}\rvert^2=\lvert R-\delta\rvert^2$ |

The difference in measured intensity between the first and second measurements in this embodiment is similar to the above equation 5. Similarly, the resulting term of equation 5 is directly proportional to δ and thus provides a direct measure to estimate the asymmetry of the inspected region of the sample. As mentioned above, symmetrical pattern on a sample can be identified if the difference between the first and second measurements is below a predetermined threshold. Thus, if a certain level of symmetry is desired; the sample is considered appropriate if the measured quantity has the desired value within certain error limits.

Figure 4C:
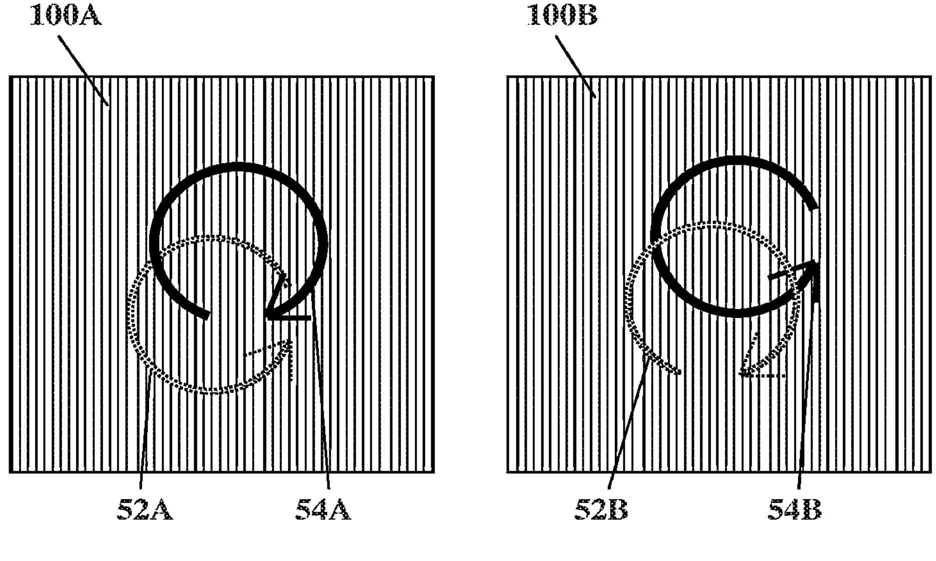

In the example of FIG. 4C, the first and second measurements 100A and 100B are performed using circular polarization for the illumination and collection channels. In this embodiment, the first and second measurements are done utilizing a circular polarization filter in the illumination channel providing counterclockwise and clockwise polarized illumination 52A and 52B, and analyzer in the collection channel is oriented to allow passage/collection of light at clockwise and counterclockwise circular polarizations 54A and 54B.

In a similar manner to the above, a difference between the first and second measured data pieces (intensities) is directly indicative of a level of reflection symmetry of the inspected region. Moreover, the determined data provides sensitivity to a direction of asymmetry indicating a direction to which the pattern deviates from symmetry. This configuration provides lower sensitivity to actual orientation of the polarization filters in the collection and illumination channels.

Figure 4D:
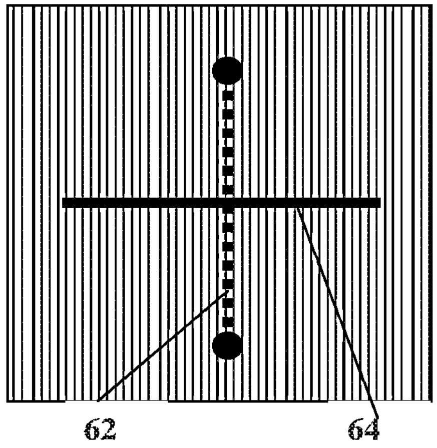

FIG. 4D exemplifies the principles of some other embodiments of the present invention. In this example, the measured patterned region is illuminated with linearly polarized light 62 having either one of p and s polarization states, reflected light is collected through the analyzer, which is configured to allow collection of the orthogonal linear polarization 64, i.e. s or p states respectively. It should be understood, however, that the polarization states of the illuminating and collected light may be interchangeable. Generally, one polarizer is aligned along the s polarization axis and the other is aligned along the p polarization axis. In this embodiment, the illumination-detection plane, defined by the illumination and collection channels, is either parallel or perpendicular to the gating lines of the pattern on the sample; and the sample is illuminated with a polarization parallel or perpendicular to the grating direction, and the collection-channel analyzer is oriented perpendicular to the illumination polarizer.

If the pattern on the measured region of the sample is symmetric to reflection, the off diagonal Jones elements $r_{sp}$, $r_{ps}$ vanish due to symmetry, and the reflected light will be blocked on the return path. However, variations from symmetry (asymmetric patterns) cause rotation in polarization of the reflected light, and give rise to nonzero signal at the detector. Thus, a single measurement may provide data indicative of the symmetry of the pattern.

Table 3 illustrates the measurement configuration based on the above described Jones matrix terms. Table 3 shows the resulting data for a measurement (measurement 1) where the illumination and collection channels are configured to allow illumination at p polarization state and collection of the reflection of only s polarization state, as well as data for the orthogonal measurement (measurement 2) where the illumination- and collection-channels' polarization filters are oriented to illuminate with s polarized light and collect the p polarized light. As shown, each of these measurements provides data about the magnitude of one of the off-diagonal elements of the Jones matrix. It should be noted that although this embodiment has an advantage of providing symmetry data in a single measurement, the resulting information does not inherently include data about direction of deviation from symmetry, as provided with the use of differential measurements.

TABLE 3

| Measurement # | α | β | $|E_{out}|^2$ |
|---|---|---|---|
| 1 | 0 | π/2 | $|r_{ps}|^2$ |
| 2 | π/2 | 0 | $|r_{sp}|^2$ |

Additionally, the sample may be inspected utilizing several, different, incident angles to provide higher sensitivity by providing data about the level of symmetry for different directions. In this connection, variation of the incident angle may provide additional information about the level of symmetry for reflection about a specific plane, while variation of the incident azimuth provides additional data about the level of symmetry for reflection about additional planes. Thus, a set of consecutive measurements according to the above described technique can provide data about the level of symmetry of a sample having complex patterns including various layers having patterns along one or more axes, thereby enabling characterization of symmetry properties with respect to one or more planes.

It should also be noted that the technique of the invention may be implemented utilizing reflected light at the above defined polarization configurations in combination with a dome spectrometer system, for example described in WO14016839 assigned to the assignee of the present application, which publication is incorporated herein by reference with respect to non-limiting examples of the use of the present invention. This can provide broad angular information, i.e. indicate level of symmetry about different planes and/or angles.

Figure 5:
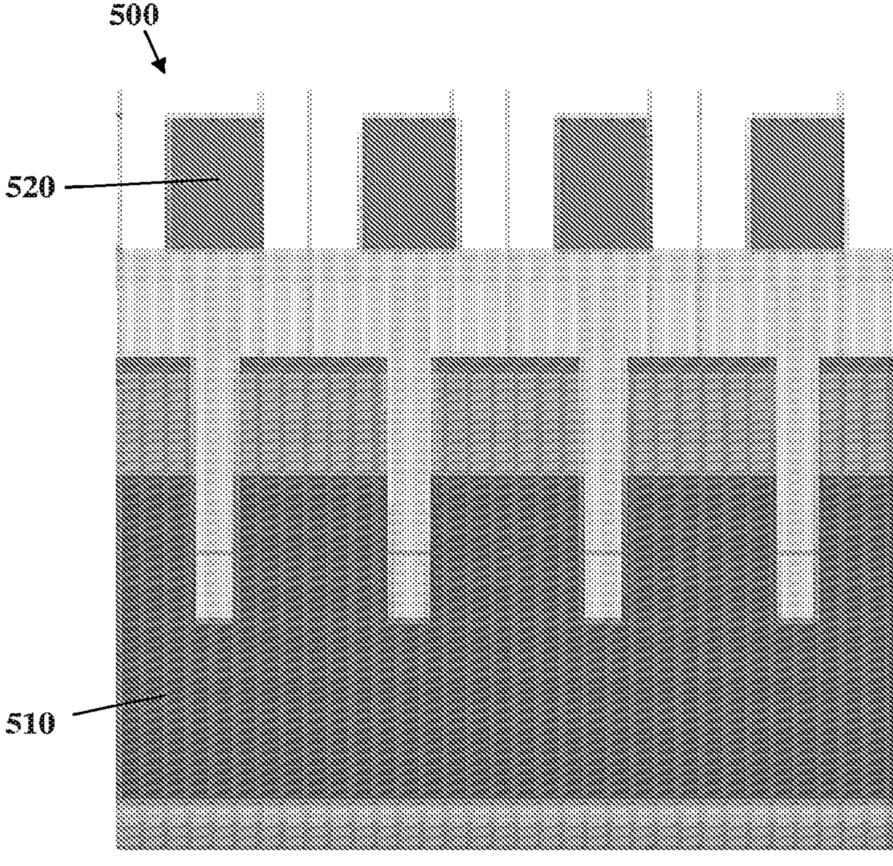
FIG. 5 illustrates a patterned sample for overlay mismatch measurement.

As indicated above, the technique of the present invention provides efficient and accurate information about the level of symmetry of a patterned sample. The advantages of the technique can be demonstrated utilizing measurement on a known sample, which is schematically illustrated in FIG. 5. The figure illustrates a litho-etch-litho-etch manufactured sample 500 including two printed patterns with a predetermined overlay. The first pattern 510 is printed on a wafer, the wafer is then transferred into silicon and then a second pattern 520 is printed with half-period shift to allow a second etch process to transfer it into silicon for a pitch-doubling effect. The overall pattern has a pitch size of 2400 Å. The technique of the invention was used to detect overlay shifts between the first litho-etch step (layer 510) and the second lithography pattern 520. As indicated, the parameter for characterization in such patterned samples is the degree of alignment between the layers 510 and 520. When aligned perfectly, the structure is mirror-symmetric, while misalignment would break this symmetry. It has been shown that measurement using a standard polarized reflectance is very difficult due to the low spectral sensitivity to the overlay shift.

Figure 6:
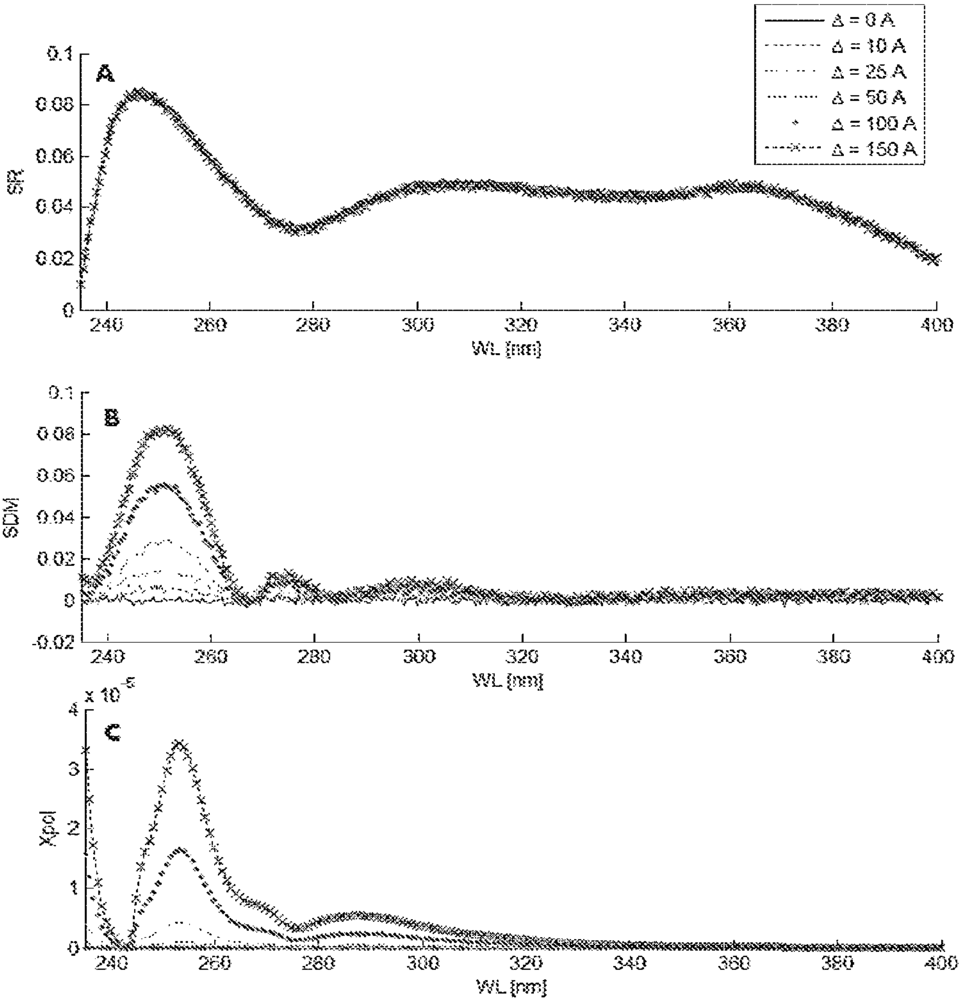
FIG. 6 shows measurement results obtained on the sample of FIG. 5 using the technique(s) of the invention and the conventional technique for overlay mismatch measurements.

FIG. 6 shows measurement results of misalignment (Δ) between the patterned layers 510 and 520 of the sample of FIG. 5 as measured in different reflected spectra. Graph A corresponds to the measurement results for the conventional technique of spectral reflectometry (SR) using p-polarized illumination. Graph B corresponds to the measurement results of spectral differences metrology (SDM) according to the present invention where the illumination and collection channels utilize linear polarizer and analyzer as described above with reference to FIG. 4B. Graph C shows the results provided by the technique of the present inventions utilizing circular polarization as exemplified above with reference to FIG. 4C where single measurement provides for detecting the asymmetry condition of the pattern.

As shown, the effects of misalignment on the measured spectra using the conventional SR technique (graph A) are weak, and may generally be completely overwhelmed by noise, the measurement had signal to noise ratio (SNR) of about 100. As for the results for the SDM technique of the invention, graphs B and C, they show clear sensitivity to misalignment, well above the noise threshold.

It should also be noted that the technique of the present invention as described above provides for determination of deviations from symmetry of the pattern, while having low sensitivity to uncertainties unrelated to symmetry. It is known that Optical Critical Dimensions (OCD) measurements commonly suffer from difficulty in separating between variations of the parameters of the structure (in this case, the misalignment of the patterned layers) and other parameters characterizing the application (critical dimensions, thicknesses), which may have significant effect on the measured spectrum but are of no practical interest. The spectra obtained using the technique of the invention specifically highlights sensitivity to misalignment, while being insensitive to the other parameters characterizing the application.

The signal obtained using any of these techniques can be analyzed in one of several ways. One example would be to follow the standard approach utilized in OCD metrology, namely to compare the measured signal with a calculated (model-based) signal. The calculated signal corresponds to some structure with known geometrical attributes. Once a good fit is obtained between the calculated and measured signals, it is assumed that the geometrical and material properties of the best-fit calculated structure correspond to those characterizing the measured structure. Calculation of the reflected signal can be based on one of many optical modeling techniques (e.g. Rigorous Coupled Wave Analysis, Finite Element Method, Finite Difference Time Domain etc.). It is furthermore possible that the calculation effort involved in interpretation of measurements taken using the approach described in this invention will be significantly simplified, compared to standard OCD. Whereas for most OCD applications, the reflected signal depends on multiple parameters characterizing the measured target, in this invention the dependence on most parameters will be weak, and the dependence on some geometrical\material properties could be neglected.

An alternative approach would be based on an empirical approach. In this method, in a first step (termed the 'learning' stage), signal will be measured for few samples of known characteristics (characterized by some other reliable metrology method). A correlation will be established between the measured signal and the geometrical property of interest. For example, the analysis can establish a relationship between the amplitude or position of some specific spectral peak and the parameter of interest. Samples measured following this step will be analyzed based on the found correlation. The fact that the method presented in this invention is highly effective in highlighting the dependence to the parameters of interest makes such empirical approach realizable, using a small set of samples for the learning stage.

Thus, the present invention provides for a novel technique enabling simple and robust analysis of symmetry properties of patterned substrates. Those skilled in the art will readily appreciate that various modifications and changes can be applied to the embodiments of the invention as hereinbefore described without departing from its scope defined in and by the appended claims.

We claim:

1. A measurement system configured to measure a sample, the measurement system comprising:
an optical unit; and
a control unit;
wherein the optical unit is configured to:
(a) perform a first measurement of a patterned region of the sample, while applying a first measurement configuration of the optical unit, on a patterned region of a sample, and generating a first data piece; wherein the first measurement comprises illuminating the patterned region of the sample only with illumination light of a first linear polarization; and collecting light from the patterned region of the sample and having another polarization that differs from the single first linear polarization and differs from a second linear polarization, the second linear polarization differs from the first linear polarization;
(b) perform a second measurement of the patterned region of the sample, while applying a second measurement configuration of the optical unit, and generating a second data piece; wherein the second measurement comprises illuminating the patterned region of the sample only with illumination light of the second linear polarization; and collecting light from the patterned region of the sample and having a further polarization that differs from the first linear polarization and from the second linear polarization;
wherein the control unit is configured to determine the symmetry of the one or more patterns of the patterned region of the sample based on the first data piece and the second data piece;
wherein the configuration difference introduces a sensitivity to symmetry of the one or more patterns of the patterned region that is higher than the sensitivity to parameters that differ from the symmetry; and
wherein the first measurement and the second measurement form a first pair of measurements, wherein the measurement system is configured to perform one or more additional pairs of measurements that differ from each other and from the first set of measurements by an angle of incidence of the illuminating light; wherein the control unit is further configured to determine a symmetry of the one or more patterns of the patterned region of the sample along one or more axes.

2. The measurement system according to claim 1 wherein the first linear polarization is perpendicular to the second linear polarization.

3. The measurement system according to claim 2, wherein the first and second liner polarizations are oriented by plus forty five degrees and minus forty five degrees, respectively.

4. The measurement system according to claim 1, wherein the control unit is configured to determine the symmetry by applying a model-based analysis.

5. The measurement system according to claim 1, wherein the control unit is configured to determine the symmetry based on signals obtained during a learning stage.

6. The measurement system according to claim 1, wherein the control unit is configured to determine a direction of the symmetry.

7. The measurement system according to claim 1, wherein the control unit is configured to determine a level of the symmetry.

8. The measurement system according to claim 1, wherein the first measurement and the second measurement are spectral reflectometry measurements.

9. The measurement system according to claim 1, wherein the sample is a semiconductor wafer.

10. The measurement system according to claim 1, wherein the control unit is further configured to determine a sample manufacturing process parameter based on the symmetry.

11. The measurement system according to claim 1, wherein the optical unit comprises a polarization unit that comprises a first polarization filter located in the collection channel, and wherein the parameters that differ from the symmetry comprise an actual orientation of the first polarization filter.

12. The measurement system according to claim 1, wherein the optical unit comprises a polarization unit that comprises a first polarization filter located in the collection channel.

13. The measurement system according to claim 1, wherein the first linear polarization is perpendicular to the other polarization.

14. The measurement system according to claim 1, wherein the collecting of the light from the patterned region of the sample comprises collecting the light reflected from the patterned region of the sample.

15. The measurement system according to claim 1, comprising collecting light diffracted from the patterned region of the sample.

16. The measurement system according to claim 1, wherein the illumination light of the first linear polarization and the illumination light of the second linear polarization are pulsed.

* * * * *